(12) United States Patent
Packes, Jr. et al.

(10) Patent No.: US 10,209,960 B1
(45) Date of Patent: Feb. 19, 2019

(54) METHODS AND SYSTEMS FOR IMPROVED PSEUDO-RANDOM NUMBER GENERATION

(71) Applicant: LIFE IN MOBILE INNOVATIONS, INC., Stamford, CT (US)

(72) Inventors: John M. Packes, Jr., Stamford, CT (US); John W. Lim, Rye Brook, NY (US); Charles A. Rattner, Brookings, OR (US)

( * ) Notice: Subject to any disclaimer, the term of this patent is extended or adjusted under 35 U.S.C. 154(b) by 0 days.

(21) Appl. No.: 15/671,758

(22) Filed: Aug. 8, 2017

Related U.S. Application Data

(60) Provisional application No. 62/372,228, filed on Aug. 8, 2016.

(51) Int. Cl.
G06F 7/58 (2006.01)
H04L 9/06 (2006.01)
G06F 17/30 (2006.01)

(52) U.S. Cl.
CPC ........ G06F 7/586 (2013.01); G06F 17/30551 (2013.01); H04L 9/0662 (2013.01)

(58) Field of Classification Search
CPC . G06F 17/30551; G06F 7/5044; H04L 9/0662
USPC ........................................................ 708/254
See application file for complete search history.

(56) References Cited

U.S. PATENT DOCUMENTS

| | | | | |
|---|---|---|---|---|
| 2013/0263006 A1* | 10/2013 | McCoy | ............... | H04N 21/458 715/738 |
| 2015/0351068 A1* | 12/2015 | Deleeuw | ............... | H04W 64/00 455/456.1 |
| 2016/0012252 A1* | 1/2016 | Deleeuw | ............. | G06F 21/6254 726/26 |
| 2016/0371685 A1* | 12/2016 | Smith | .................... | G06Q 20/40 |

* cited by examiner

*Primary Examiner* — Tan V Mai
(74) *Attorney, Agent, or Firm* — Charles A. Rattner

(57) ABSTRACT

An improved pseudo-random number generator is introduced that has increased security due to higher randomness and lower predictability. The PRNG uses seed values that are based on a combination of various selectable values from the real-world that are typically made publicly available over a computer network (i.e., the Internet), such as: one or more weather conditions at a particular time or date and geographic location, a score of a sports event, a stock market index or ticker value, an election vote total, attendance at a cultural event, gross dollar sales from a movie release, and other such numerically quantifiable values that, individually and in combination, are impossible to exactly predict in advance, yet are precisely verifiable after the number-generating event using electronically-stored information. The improved pseudo-random number generator may be used for more secure determination of lottery outcomes and the like.

7 Claims, 5 Drawing Sheets

METHODS AND SYSTEMS FOR IMPROVED PSEUDO-RANDOM NUMBER GENERATION

CROSS-REFERENCE TO RELATED APPLICATIONS

This application claims priority under 35 U.S.C. § 119(e) to U.S. Provisional Patent Application Ser. No. 62/372,228 entitled "METHODS AND SYSTEMS FOR PSEUDO-RANDOM NUMBER GENERATION" filed in the name of Packes et al. on Aug. 8, 2016, the entirety of which is hereby incorporated by reference.

TECHNICAL FIELD

This disclosure generally relates to electrical computers, arithmetic processing and calculating, and in particular it relates to improvements in random number generation.

BACKGROUND OF THE DISCLOSURE

Random number generation has many applications in computing technology, as well as in the sciences and useful arts. Randomness is, in fact, crucial to cryptography, network security, online gaming and gambling, statistics and statistical analysis, mathematical systems modeling and many other fields. For example, in controlled medical trials, random assignment of treatments eliminates possible biases when testing treatment efficacies. Computerized generation of random or pseudo-random numbers are also required to simulate real world events in applications such as video games, as well as gaming machines like video blackjack.

Mathematically, there are well-known distinctions between randomization, pseudo-randomization, and quasi-randomization, as well as between pure random number generators (RNGs) and pseudo-random number generators (PRNGs). While hardware-based RNGs can reliably generate numerical sequences that are close to truly random, software-based PRNGs are more ubiquitous because of their speed and reproducibility. Nevertheless, such PRNGs are not truly random, because the numerical sequences are typically generated from a relatively small set of initial values, called seed values. Thus, PRNGs are susceptible to becoming more predictable when, for example, brute-force attacks or the like are surreptitiously used to determine underlying seed values.

PRNGs, also known as a deterministic random bit generators (DRBGs), comprise various algorithms, executed in software, for generating a sequence of numbers whose properties approximate the properties of sequences of truly randomized numbers. However, the requirements for randomness and predictability vary for different application. For example, applications in cryptography usually have strict high-randomness and low-predictability requirements, whereas other uses, such as generating a PRNG for determining outcomes in a children's video game, can use a looser standard of pseudo-randomness.

A PRNG suitable for cryptographic applications is called a Cryptographically Secure PRNG (CSPRNG). A requirement for a CSPRNG is that an attacker, not knowing the seed values, has only negligible advantage in distinguishing the generator's output sequence from a random sequence. In other words, while a PRNG is only required to pass certain statistical tests, a CSPRNG must pass stringent statistical tests in relation to the size of the seed(s). Existing PRNGs that have been designed specifically to be cryptographically secure include: MICROSOFT'S CRYPTOGRAPHIC APPLICATION PROGRAMMING INTERFACE function "CryptGenRandom," MAC OSX operating systems, UNIX systems incorporating FREEBSD, and LINUX systems incorporating FORTUNA.

Accordingly, as computing power continues to increase, there is a continuing need for improved methods and systems for pseudo-random number generation, which are easily implemented and effective to secure computer systems and the applications requiring randomization functions.

SUMMARY OF THE DISCLOSURE

An improved electronic computing apparatus comprises a processor, a data communications interface for bi-directional communication of electronic data over a computer network, and a memory for storing data and processing instructions for implementing a method for determining a probabilistic outcome, performed exclusively by the processor. According to such methods, a plurality of seed value categories are stored in the memory, along with at least one network location from which seed values corresponding to at least one of the seed value categories are available for retrieval via the computer network. The processor then executes specialized processing instructions for selecting at least two seed values categories, the seed value categories comprising geographic locations, future times, future dates, unforeseeable certifiable values (UCV) corresponding to outcomes of real-world events, and predictable future values (PFV) corresponding real-world events. The processor further executes processing instructions for selecting at least one seed value in each of the at least two seed value categories and updating the at least one seed value by retrieving data from the at least one network location via the data communication interface. The processor next executes processing instructions for generating, from the at least one seed value, a pseudo-random numerical sequence comprising at least one numerical value. An output of a software application may then be based on the pseudo-random numerical sequence and such output may be displayed on a user device on the computer network via the data communications interface.

In various embodiments, the unforeseeable certifiable values comprise at least one of: an outdoor temperature, an outdoor humidity level, a dew point temperature, a pollen level, an outdoor pressure value, an outdoor ultraviolet index value, a wind speed, a wind chill factor, a tide level, a predicted future weather condition, a user's actual or proximal location, a score of a sporting event, a price of an equity, a value of a capital market index, a vote total in an election, an attendance at a public event, a revenue from a motion picture release, a number of copies sold of an album or musical track, and a number of registrants to a website or promotion.

In various embodiments, the predictable future values include a moon phase and an astronomical position of one or more heavenly bodies.

In additional embodiments, the software application comprises a lottery contest, the output is a pseudo-random sequence of data generated from the at least one seed value in each of the at least two seed categories, and a winner of the lottery contest is determined by matching the pseudo-random sequence of data.

In various embodiments, the at least two seed values comprise at least two sub-categories of the same seed value category.

BRIEF DESCRIPTION OF THE DRAWINGS

Further aspects of the present disclosure will be more readily appreciated upon review of the detailed description of its various embodiments, described below, when taken in conjunction with the accompanying drawings, of which.

DETAILED DESCRIPTION OF THE SPECIFIC EMBODIMENTS

Figure 1:
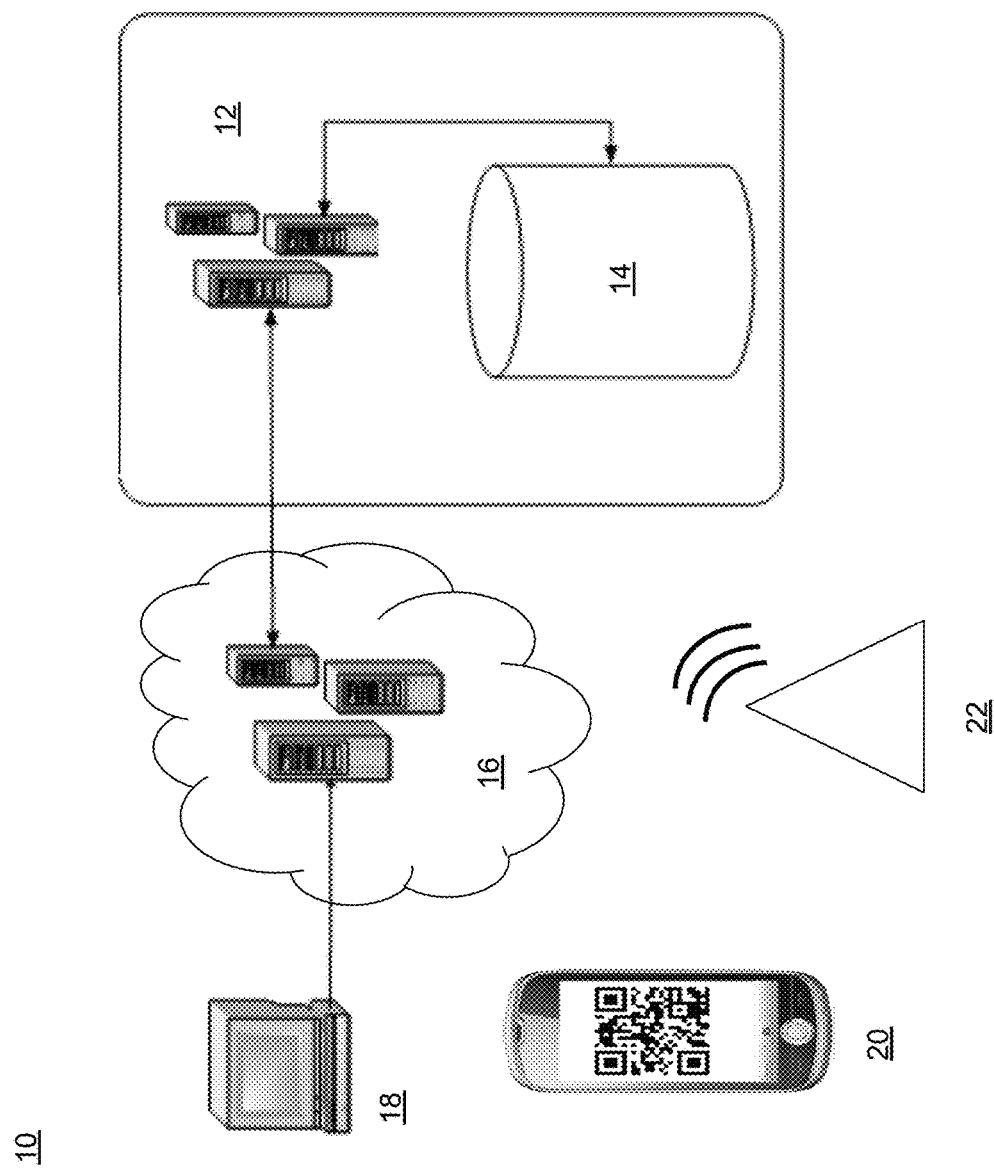
FIG. 1 is a diagram of an exemplary network environment in which the present disclosure may be utilized.

Referring now to FIGS. 1-5, wherein similar components of the present disclosure are referenced in like manner, various embodiments of improved methods and systems for pseudo-random number generation are disclosed. Turning now to FIG. 1, therein is presented a diagram of an exemplary computer network environment 10 in which the present disclosure may be utilized. The network environment 10 may include one or more specially-programmed network servers 12 operated by an operator as described herein. The network servers 12 are the hub of the network environment 10, the special programming of which as described herein enables the network servers and clients to interact as described herein over, for example, the Internet and/or other suitable data communications networks. The network servers 12 may be one or a group of distributed or centralized network computer servers. Such servers, like any common personal computer, include well-known processors, electronic memory, network communication hardware, user interfaces, input/output devices (or components), operating system software, and application software suitable for accomplishing the functions described herein. A suitable computer server may be one or more enterprise network servers of the type commonly manufactured by, for example, CISCO, DELL and IBM. The network servers 12 may be configured to perform the functionalities described herein through suitable programming in C++, PHP, HTML, JAVASCRIPT or the like, and may include databases 14 including database management software, for example, similar to the SQL-type databases distributed by ORACLE. The network servers 12 may be centrally located or may be distributed among a variety of geographical locations, and may cooperate to enable the functions described herein. It is contemplated that the network servers 12 may be owned and operated by an entity that is distinct from the web servers or third-party data sources 16 and client devices.

Client devices, such as computers 18 and portable electronic devices 20, may communicate with the network servers 12 over a variety of network types, such as a public computer data network, a private computer data network, an intranet, an extranet, the Internet, a fiber-optic network, a telephone communications network, a cellular communications network, a satellite communications network, or any combination of these or similar hard-wired or wireless data or communications networks without limitation. Communication of data between the client devices 18 and the network serve 12 may be accomplished via one or more web servers 16. The third party information servers described later herein may also communicate with the network servers 12 via certain of the web servers or third party data sources 16 as well.

Computers 18 may include, for example, any one or more of the following devices: a personal computer, laptop computer, notebook computer, portable computing device, tablet, personal digital assistant or like device of the type commonly manufactured by IBM CORP, DELL CORP. and APPLE CORP., and having suitable operating system software (i.e., WINDOWS XP, WINDOWS VISTA, WINDOWS 8, MAC OS X, SUN OS for personal computing devices and APPLE IOS and ANDROID OS for mobile devices), application software, visual displays, processors, electronic memory, network communication hardware, user interfaces, and other suitable input/output devices, as are well-known and suitable for accomplishing the functions described herein. Portable electronic devices 20 may include any portable computing or communicating devices, such as mobile telephones or smartphones, such as the IPHONE manufactured by APPLE or the GALAXY manufactured by SAMSUNG. Computers 18 and portable electronic devices 20 may receive special programming from the network servers 12 in the form of an application (app) application and/or via the website through which customers and vendors log in to the network servers 12, which special programming is used to accomplish various of the functionality described herein.

Users may employ the portable electronic device 20 to communicate data with network servers 12. In various embodiments, the portable electronic device 20 may communicate with the network environment 10 via the wireless antenna 22. The portable electronic device 20 may be equipped with a camera and suitable scanning software to allow it to scan, image or otherwise input a code, such as a QR code., encountered in the real world. The portable electronic device 20 may be any type of device, heretofore known or later developed, which is operable to receive an input, image or scan of a code by a consumer, and which further includes a transmitter and a receiver for communicating signals over a wireless communications network. In various embodiments, the portable electronic device 20 may be a cellular telephone having an imaging device, such as a still or video camera. The portable electronic device 20 may also include an interface, such as a web browser application, for accessing the Internet or other computer network. Examples of such web browsers include SAFARI, GOOGLE CHROME, INTERNET EXPLORER and FIREFOX. The portable electronic device 20 may also include appropriate native hardware and software to send and receive short message service (SMS) or text messages, and electronic mail messages. A proprietary application may optionally be provided on the portable electronic device 20 to perform the scanning and/or web interface functions described herein. The portable electronic device 20 may additionally include appropriate hardware and software for interacting with a global positioning system (GPS), such that the portable electronic device 20 may determine its geographic location. Additionally, the portable electronic device 20 may include any of a variety of software applications for imaging and decoding a code or symbol, such as a QR code. Examples of such code-reading applications include NEO-READER, MOBILETAG and CODE READER. Examples of cellular telephones on the market today that are equipped with the features above include the IPHONE, BLACKBERRY, and ANDROID smartphones.

The portable electronic device 20 is operable to communicate bi-directionally with a network servers 12 over any of a variety of communications networks. Such communications networks may include a cellular telephone network, a cellular data network and a wireless computer network of the type operated by VERIZON and AT&T. The communication network may provide access to any variety of hardwired or wireless computer networks now known or heretofore developed, including, without limitation, local area networks, wide area networks, fiber optic networks, satellite communication networks, as well as the World Wide Web.

The web servers or third-party data sources 16 may be one or a group of distributed or centralized network computer servers. Such servers, like any common personal computer, include well-known processors, electronic memory, network communication hardware, user interfaces, input/output devices, operating system software, and application software suitable for accomplishing the functions described herein. A suitable computer server or web server may be one or more enterprise network servers of the type commonly manufactured by CISCO, DELL and IBM. The third-party data sources 16 may be configured to perform the functionalities described herein through suitable programming in C++, HTML, JAVASCRIPT or the like, and may include databases and database management software, for example, of the type distributed by ORACLE. The computer servers 12 may operate a website on the Internet for interfacing with client devices or the computer servers 12.

Figure 2:
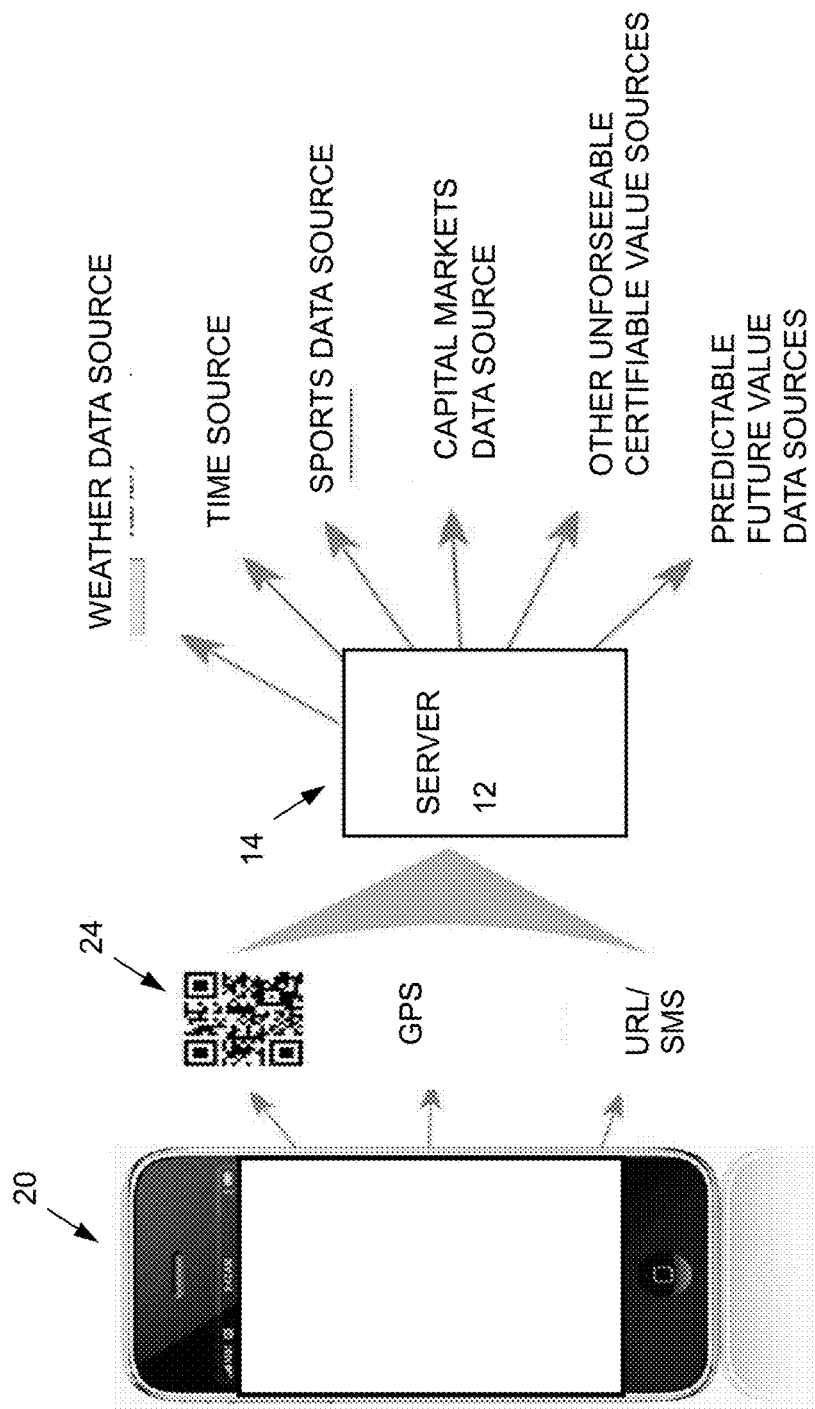
FIG. 2 is a depiction of a user device in communication with a server of the network environment of FIG. 1.

With reference to FIG. 2, the portable electronic device 20 may be used to image or scan a code, and upon decoding of the same, to initiate a communication with a website or other specialized programming operated by the computer servers 12. There is depicted one type of QR code 24, such as a Quick Response (QR) code, which may be used with the present disclosure. Information is typically encoded within such a QR code in two-dimensional formats in a variety of manners that are well known in the art. The data encoded in the QR Code, of course, can not be changed since the underlying data is typically used in the image generation of the code itself. Thus, every time that the QR code is scanned the same data will be decoded from the image. In various embodiments of the present disclosure, it should be recognized that the QR code may encode a computer network address, such as a Uniform Resource Locator (URL) address on the Internet. It should also be readily appreciated that any type of data, code or symbology may be used in place of a QR code, such as a one-dimensional barcode, a two-dimensional barcode, a dataform, a dataglyph, alphanumeric text, a photographic image, a URL, an SMS code, or any other symbologies heretofore known or later developed.

In additional embodiments, however, such communications may instead be initiated by the user transmitting a code to a specific SMS address via a text message, or the like. For example, a billboard or like display at a physical location may present a code and/or a printed message, such as "Text "<alphanumeric code>" to <SMS address>." When the user transmits the code to the SMS address with the portable electronic device 20, the computer servers 12 may then determine what content to deliver to the portable electronic device 20 based on various rules. Alternatively, or in addition thereto, the user may be presented with a website or URL to enter into a browser of the portable electronic device 20. When the portable electronic device 20 accesses the website or sends an e-mail, the computers 12 may determine the content to be delivered in reply according to the aforementioned rules.

In an alternate embodiment, the input of the code could be a photograph or image of an offer, product, storefront, or any other image taken by the camera of the portable electronic device 20 from which one or more image features may be recognized by the compute servers 12 using known image recognition technology. Examples of such technology include software and services provided by LOOK THAT UP (LTU) TECHNOLOGIES, SNAP TELL or GOOGLE GOGGLES. In addition, the input may come from a device such as GOOGLE GLASS or other augmented reality platforms. A rule may be established in the computer servers 12 that when a given feature is identified in an image submitted by the user, particular content is to be delivered in response.

In response to a scan or any other indication of a code received by the computer servers 12, the computer servers 12 may return any of a variety of content to client devices. This includes a merchant web site address or web page, a coupon from a merchant, audio/video content, photographs, business contact information, confirmation of sweepstakes/lottery entry or the like. Such content is to be delivered according to any of a variety of suitable rules and conditions. In various embodiments, the content to be delivered in response to the code received from a user may be determined as follows. All code inputs may be initially directed from wireless devices 20 to the computer servers 12. Based on the code, content, or other information, and in accordance with the programmed rules, the computer servers 12 may query to an internal database using one or more parameters associated with or parsed from the received code. The parameters are passed and the database results or content may be delivered to the portable electronic device 20. The content may, in certain instances, be a redirection to a merchant web site or the like. One of ordinary skill in the art will appreciate from the foregoing that dynamic redirection of user's browsers to desired web site location can be accomplished in this manner without placing cookies or other tracking implementations on each user's portable electronic device 20, as was customarily done in the prior art.

The computer servers 12 include, inter alia, specialized programming instructions for retrieving data from web servers or third-party data sources 16. The information retrieved may include weather data, time and date data, geographic location data, sports data, capital market data, other unforeseeable certifiable value (UCV) data, and predictable future value (PFV) data. In various embodiments, the weather data may comprise an outdoor temperature, an outdoor humidity level, a dew point temperature, a pollen level, an outdoor ultraviolet index value, a wind speed, a wind chill factor, a tide level, a predicted future weather condition, and other like real world weather data values, such as is available from WEATHER.COM. Time and data may be available from third-party data sources such as TIMEANDDATE.COM. Geographic location data may be available from third-party sources such as MAPQUEST.COM or GOOGLEMAPS.COM. Sports data, such as the outcome of a sporting match or other statistics therefrom may be available from third party sources such as ESPN.COM. Capital market data, such as stock, currency or equity trade values or market index values, may be available from third-party sources such as TDAMERITRADE.COM, FOREX.COM, and MARKETWATCH.COM. In various embodiments, the computer servers 12 may retrieve such information by direct data communication connection to a measuring device, for example, a digital thermometer, a barometer, an anemometer, etc., rather than relying on third party collection and reporting of such data.

UCV data may include any value that is not knowable in advance of an event but is readily certifiable after the event by reference to a third-party data source. In particular, UCV data is preferably impossible to exactly predict in advance, yet are precisely verifiable after an event or time using publicly-available, electronically-stored information. In addition to the weather, stock and capital market data mentioned above, other types of UCV data may include things such as gross revenue from a movie release, attendance at or outcome of a cultural, sporting or public event, a vote total in an election, a number of copies sold of an album or musical track, and a number of registrants to an online or live promotion or event. PFV data, on the other hand, include future values that are predictable in advance, such as sunrise, sunset, planetary alignments, eclipses, lunar/moon phases, appearance of transient astronomical objects and heavenly bodies, and other astronomical events.

The computer servers 12 are specially programmed with processing instructions for executing the creation of a pseudo-random number sequence using a plurality (i.e., two or more) of the values described above that may be used as seed values for generating a pseudo-random sequence. In certain embodiments, the pseudo-random sequence may simply be generated directly from the combination and order or other concatenation of the selected values themselves. In various other embodiments, the retrieved values may be used as randomized seed values that are input into a pseudo-random number generation program to determine a resulting pseudo-random sequence. In either event, the pseudo-random sequence may then be provided to an application or program on the client device for affecting an outcome of such application or program.

Advantageously, when the source of the seed values are preserved (i.e., stored in a database 14), the pseudo-random sequence may be reverse-analyzed (for example, by one with detailed and authorized knowledge of the operation of the PRNG program or by incorporating additional specialized programming instructions for accomplishing the same) to compute the seed values and thereby confirm a legitimacy of an entered pseudo-random sequence based on the verifiable real-world values from which they were selected. This could be accomplished by mathematically applying the outcomes to the known random values used in the pseudo-random number generation function employed to determine the remaining seed values used, in combination with a mathematical comparison of the determined seed values to the stored seed value categories used to select the seed values. The determined seed values, in combination with the known seed value categories can be compared to actual data for those seed values at the time of generation of the pseudo-random sequence to confirm that the results are legitimate. In effect, this operation is comparable to a reverse hashing function. This advantage is of course unavailable to ordinary users, and is preferably secured (by encryption, cryptography and like computer security measures) from access by third-party attackers or hackers who attempt to foil the unpredictability and security of the PRNG operation. In various embodiments, the computer servers 12 may instead cause an app to be installed on the client devices for accomplishing these functions locally on the client device.

Figure 3:
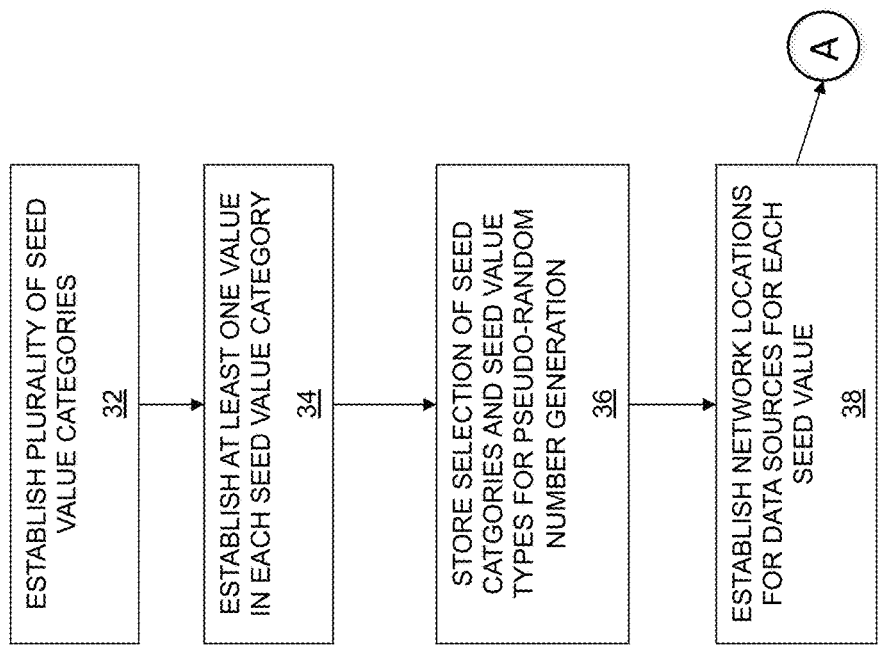
FIGS. 3-4 are a flowchart of an exemplary pseudo-random number generation process performed by the server of FIG. 1.
Figure 4:
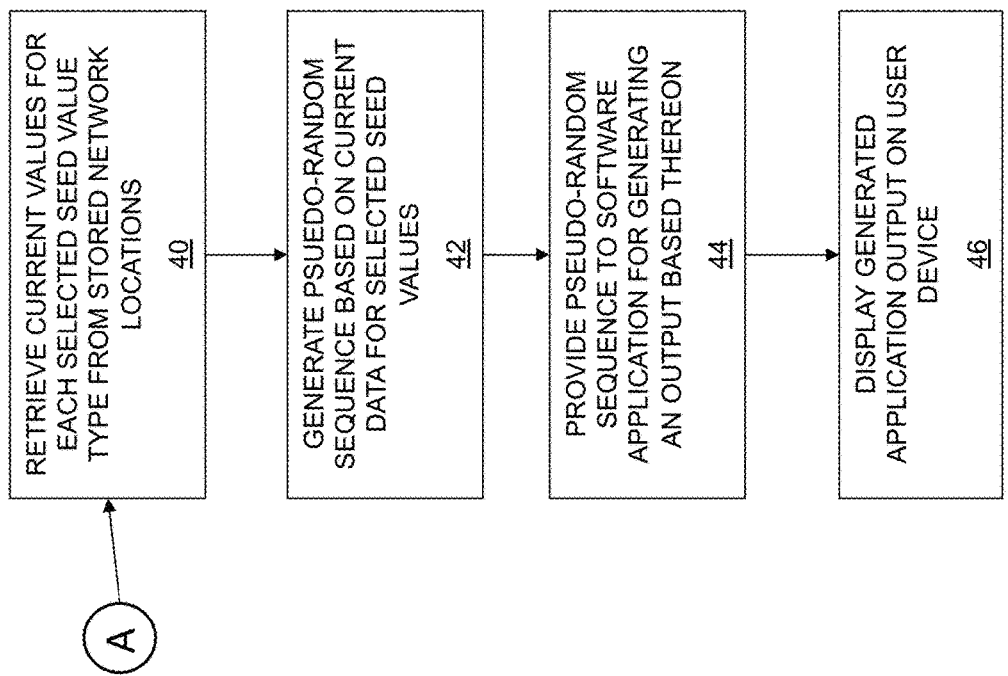

Turning now to FIGS. 3-4, therein is depicted an exemplary method 30 for generating a pseudo-random (alphabetical, numeric, alphanumeric or other useful symbology) sequence, for example, from the seed values described above. In various embodiments, the method 30 may be performed by network servers 12 using, for example, data and information retrieved from web servers or third-party data sources 16.

The method 30 commences at step 32 where a plurality of seed value categories are established. Seed value categories may include any one or more of the categories described above, such as: weather data, time and date data, geographic location data, sports data, capital market data, other unforeseeable certifiable value (UCV) data, and predictable future value (PFV) data. In various embodiments, at least two different seed value categories are selected such that that pseudo-random numbers generated therefrom are less predictable in advance. In various embodiments, the selected seed value categories include at least one UCV so that pseudo-random numbers generated therefrom are less predictable in advance. In various embodiments, the selection of the seed value categorize themselves may be randomized. In some embodiments, only a single seed value category may be selected. An increasing number of seed value categories may be selected in accordance with the levels of desired complexity, security and lack of predictability that is desired for a given application using the pseudo-random number generated hereby.

Next, at step 34, at least one seed value from each established seed value category is established. Each available seed value is a sub-category of one of the seed value categories. Accordingly, a selected seed value is a sub-category of at least one of the seed value categories selected in step 32. By way of non-limiting example, where the selected seed value category is weather data, corresponding seed values available as a sub-category thereunder may be a current temperature or a current barometric pressure reading. In various embodiments, a plurality of seed values may be selected from each of the selected seed value categories in order to improve randomness and decrease predictability. In various embodiments, at least two different seed values are selected such that that pseudo-random numbers generated therefrom are less predictable in advance. In various embodiments, the selected seed values include at least one UCV so that pseudo-random numbers generated therefrom are less predictable in advance. In various embodiments, the selection of the seed values themselves may be randomized. In some embodiments, only a single seed value may be selected. An increasing number of seed value may be selected in accordance with the levels of desired complexity, security and lack of predictability that is desired for a given application.

Next, at step 36, the selected seed value categories and selected seed values are stored in a memory by computer servers 12 for use in pseudo-random number generation. In order to secure such data it may be encrypted in any of a variety of known manners prior to electronic storage.

Next, at step 38, network locations for data sources corresponding to each seed value selected in the preceding steps are identified. This may be performed by computer servers 12 by maintaining and referencing a suitable database or the like stored in memory that relates each seed value to a particular web server or third-party data source 16 that routinely provides such information.

Continuing to FIG. 4, at step 40, the method 30 continues where current values for each selected seed value are retrieved from the network location or locations identified in the previous step and stored in the memory of computer servers 12 for accomplishing pseudo-random number generation therefrom. By way of non-limiting example, where the selected seed value is a current outdoor ambient temperature at a selected geographical location, the computer servers 12 may query or page-scrape such information from a database or web page of a selected third-party data source, such as WEATHER.COM. In additional embodiments, such values may be obtained from appropriate measurement devices directly. In various embodiments, current seed values may instead be randomized or manually selected rather than being derived from actual current conditions at the time of selection.

Next, at step 42, the computer servers 12 generate a pseudo-random sequence based on the current retrieved data for the selected seed values as retrieved in the previous step. Preferably, the computer servers 12 generate these numbers in a very unpredictable way so attackers can't guess them. Such pseudo-random numbers are essential for secure encryption, whether for encrypting local data or using a secured HTTPS website on the Internet. One algorithm for pseudo-random number generation that uses the selected seed values is as follows:

int rand( ){random_seed='seed values' *1103515245+12345;

return (unsigned int)(random_seed/65536) % 32768;}

The initial pseudo-random value above called 'random_seed' is initially set to include one or more of the selected seed values that may then be multiplied by a large prime number (i.e., 1,103,515,245) and then a random number (such as 12,345 or, in various embodiments, another suitable seed value) gets added to that product. The algorithm then divides the resulting total by another large random value (such as 65536 or, in various embodiments, another suitable available seed value). The result of this division function is then presented as a pseudo-random number.

Another useful pseudo-random number generating algorithm as described herein may be used to generate a sequence of values according to the following recurrence:

$X(n)$=given initial value, $X(n+1)=(((P1 \times n)+P2) \pmod{N}))$
    $n=0, 1, 2, \ldots$.

The well-known mathematical function 'mod N' requires that the expression being operated upon is divided by a selected base value N, and then replaced with just the resulting remainder. To understand the mechanics of these functions together in this algorithm, consider the following non-limiting example:

For values $X(n)=79$, $N=100$, $P1=263$, and $P2=71$
    Then
    $X(1)=79*263+71 \pmod{100}=20848 \pmod{100}=48$,
    $X(2)=48*263+71 \pmod{100}=12695 \pmod{100}=95$,
    $X(3)=95*263+71 \pmod{100}=25056 \pmod{100}=56$, and
    $X(4)=56*263+71 \pmod{100}=14799 \pmod{100}=99$.

Thus, this algorithm results in the pseudo-random sequence output string of 48, 95, 56 and 99 for the given initial values selected. Such algorithm and useful variations thereof may be programmed in any of a variety of useful executable processing instructions in any suitable computing language or protocol.

Next at step 44, the generated pseudo-random sequence to is provided to a software application for generating an output based thereon. For example, in the realm of cryptography, the generated pseudo-random number sequence may be used as an enhanced, secured encryption key generated from unpredictable or randomly selected seed values. In an exemplary gambling or gaming machine application, the generated pseudo-random sequence may be used to randomly determine the outcome of a gaming event, such as which symbols appear on various slot reels of a slot machine. In an exemplary lottery application, the pseudo-random number sequence may be used to determine a winning combination of numbers for winning a lottery draw. Other useful applications are readily contemplated.

Figure 5:
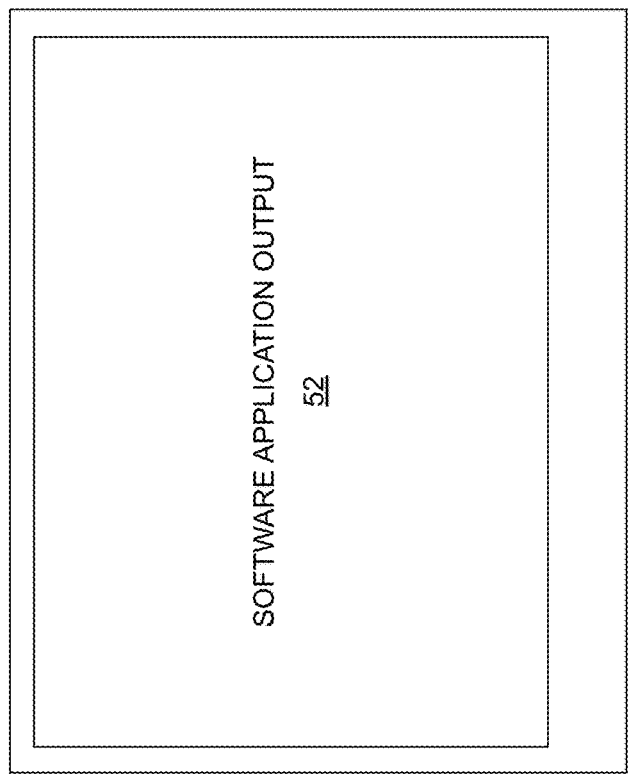
FIG. 5 is a depiction of an output of a software application using the exemplary pseudo-random number generation process of FIGS. 3-4.

Finally, at step 46, the application output generated in response to the pseudo-random sequence may be displayed on a display device of a client device, such as a touchscreen or monitor. FIG. 5 depicted an exemplary display 50 of an output 52 on a display device of the computer 18 or portable electronic device 20, generated in response to the pseudo-random sequence generated above. The method 50 then ends, or is re-initiated at a subsequent time to generate another pseudo-random sequence as needed. It should be readily appreciated that the computers accomplish the functions described herein are operated at a pace that is not readily achievable by an individual manually making such calculations. Manual determination of such pseudo-random values are likewise undesirable from a design perspective since the methods for determining pseudo-random sequences would be known outside the processing system and therefore, is rendered less secure. The current problems of expense and security with pseudo-random number generation are addressed and overcome by this disclosure in a specific technological environment involving solely computer technology-related issues.

While certain pseudo-random number generation efforts have focused on such things as monitoring naturally random quantum effects to generate purely random sequences for seed values, such efforts are usually quite costly, starting with the expensive equipment typically needed to determine such quantum values. The present disclosed methods, on the other hand, utilize purely random macro effects from the real world as seed values for pseudo-random number generation. Such seed values are readily determinable from a variety of sources on the Internet, or are otherwise determinable at minimal cost. The use of UCV values from the real world, in particular, represent secure seed values that may more securely determine pseudo-random sequences with little cost in terms of dollars and computing power and data bandwidth.

The pseudo-random sequences generated herein have a plurality of useful applications in a variety of technological environments. In one example, the disclosed methods of pseudo-random number generation may be used for compliance with the various nations' lottery laws, such as Polish lottery laws, where the conditions or outcomes required to win a prize must be disclosed in advance to contestants. In such example, a plurality of seed value categories and seed values are selected in advance. When real world conditions are met, a contestant may make a submission in which the required values from the real world are actually met, and upon matching the established conditions, the lottery is won. In a particular, non-limiting example of the lottery application described here, suppose that a geographic area is first selected, say Warsaw, Poland. Then a desired temperature value is selected, say 75 degrees Fahrenheit. Then a date is selected, say, Jul. 15, 2020. In such case, this winning combination is disclosed to contestants. Suppose a contestant is using a client device, or is otherwise present in Warsaw on Jul. 15, 2020. If the temperature is at 75 degrees during that day, the client device may confirm position data of the contestant to computer servers 12 over the network environment 10. Such contestant may then be determined to be a winner. If one or more conditions are not met, the contestant has not won. Functionally, the computer servers 12 may recognize a winning contestant by generating and storing a pseudo-random sequence according to the method 30 using the above selected seed values. The client device would then use the same variable to generate a pseudo-random sequence (either locally or via the computer servers 12) for submission to the computer servers 12. A match of the pseudo-random sequence generated from the submitted contestant variable to the stored pseudo-random sequence would confirm a win by the contestant. Such functionality is more secure than existing methods since UCV variables as they occur in the real world can not be faked by a contestant.

In various embodiments, a randomization of selected seed value categories and seed values is employed to further guarantee the unpredictability of a pseudo-random sequence in advance by non-authorized persons. In such embodiments, random seed values are automatically selected by a suitable random selection function from a list of available choices, such as may be stored in a database of the computer servers 12. Multiple randomly selected seed values may be employed as the seed value and/or random variables (i.e., variables P1 and P2 above) used in the pseudo-random number algorithms described above, or in similar or equivalent algorithms.

Various additional rules may be employed in the above lottery embodiments to determine a winner. For instance, if two contestants meet the requirements for a win, both winners may split or separately receive the entire win amount. Alternatively, the first contestant making a winning submission may win. In further embodiments, the computer server systems may be programmed to selectively provide a push notification (such as by e-mail, phone call or SMS message) to contestants in a position to win the contest, and the first contestant to respond may win. In further embodiments, a qualifying contestant in closest to proximity to a geographic location may be determined to win. In various embodiments, a plurality of prizes may be offered by lottery, with each prize subject to its own set of winning combinations of macro seed values, and in such embodiments, when conditions are met, that prize is won and removed from prize pool. In various embodiments, the winning prize may be varied based on external conditions (e.g. win a free coffee in the morning or when its cold, or win free beer at night or when it is warm). In various embodiments, the number of seed values selected is based on a desired complexity or simplicity, and/or participation or anticipated participation in a lottery or other contest. For example, where there are more participants, a low number of seed values may be selected according to the desired number of winners. Likewise, for a larger number of participants, a larger number of seed values may be used. The number and types of seed values used may also be selected based on the number of prizes to be handed out. For example, where there are many prizes, a lower number of seed values may be used, resulting in it being easier to match the desired outcome, and therefore more prizes being awarded. Statistical analysis techniques may be used to ensure that the number of prizes distributed will be appropriate for the number of participants.

It is readily contemplated that in a lottery application based on real-world conditions, many contestants will meet the qualifying conditions at the same time. In some embodiments, each such contestant may be a winner. In additional embodiments, there may be a tie-breaker condition that must be met to determine a single winner. For example, each qualifying contestant submitting the correct seed values may receive a push notification (i.e., e-mail or SMS) at their client device and the first to respond via suitable reply from the client device will be the single winner. In alternate embodiments, the qualifying contestant who is closest to a geographic location (as determined from GPS data or current Internet Protocol (IP) address of the client device connection to the Internet or the like of the client device) may be the single winner. Alternate tie-breaking conditions may further include the qualifying contestant who registered for the contest earlier than other qualifying contestants or similar condition. Other suitable methods of determining a tie-breaking condition are readily contemplated.

In addition to lottery and like applications, other environments and applications are readily contemplated to make use of the pseudo-random number generation methods disclosed herein. For example, the computer servers 12 may be programmed to distribute text or audio communications based on seed value conditions being met. The generated pseudo-random sequences may be used in cryptography as a hash/reverse hash value, one-way hash value, salting value and other encrypting functions. In various embodiments, a digital time capsule having a data payload may be stored until real world macro conditions again meet the real world conditions that were used to as seed values to generate the pseudo-random number sequence as described above. In various embodiments, an augmented reality or virtual graffiti application may allow placement of a virtual digital time capsule at a real world location, the contents of which may be encrypted with various of the seed values as described, and may only be available to another individual running the application at the real-world location when the real-world conditions match the seed values used to encrypt the virtual digital time capsule. In various embodiments, the computer servers 12 may operate an offer engine powered by the pseudo-random number generation methods described herein, where offers are provided to participants based on real world conditions and vendors can bid on the particular offer conditions to which their offer applies.

Various of the algorithms described involve the communication of data between devices. Any of a plurality of known communications protocols may be employed to accomplished these specially-programmed functions. A non-limiting example of an HTTP protocol network communication request for data is as follows:

```
var http=require('http');
var options={host: 'www.weather.com', path: '/location/?currenttemp=1&min=-100&max=150&col=1&base=10&format=plain&rnd=new'};
callback=function(response)
var str="current temperature";
response.on('data', function (check) {str+=check;});
http.request(options, callback).end( )
```

Various of the embodiments disclosed herein require the recall of stored data from a database or memory. Any of a variety of data protocols may be used to accomplish these functions. A non-limiting example of a Structured Query Language (SQL) database query is as follows:

```
SELECT CURRENT TEMPERATURE,
FROM WEATHER_TBL
WHERE CITY='MANHATTAN, N.Y., USA';
```

It should be readily appreciated by one of ordinary skill in the art that the functions described above as executed by a process of a specially-programmed computing system, such as computer servers 12, the functionality may be provided equivalently in any of a variety of computer programming languages and network communication protocols as now known or later developed.

Although the best methodologies have been particularly described in the foregoing disclosure, it is to be understood that such descriptions have been provided for purposes of illustration only, and that other variations both in form and in detail can be made thereupon by those skilled in the art without departing from the spirit and scope thereof, which is defined first and foremost by the appended claims.

What is claimed is:

1. An improved electronic computing apparatus for determining a probabilistic outcome, comprising:
a processor;
a data communications interface for bi-directional communication of electronic data over a computer network; and a memory for storing data and processing instructions for implementing a method, performed exclusively by the processor, the method comprising:

executing processing instructions for storing seed value categories in the memory, the seed value categories comprising; geographic locations, future times, unforeseeable certifiable values (UCV) corresponding to outcomes of unpredictable real-world events, and predictable future values (PFV) corresponding to occurrences of predictable real-world events;

executing processing instructions for storing at least one network location from which seed values corresponding to at least one of the seed value categories are available for retrieval;

executing processing instructions for selecting at least two of the seed value categories;

executing processing instructions for selecting at least one seed value in each of the at least two seed value categories and updating the at least one seed value by retrieving data from the at least one network location via the data communication interface;

executing processing instructions for generating, from the at least one seed value in each of the at least two seed value categories, a pseudo-random data sequence; and executing processing instructions for determining an output of a software application based on the pseudo-random data sequence and displaying the output on a user device on the computer network via the data communications interface.

2. The apparatus of claim 1, wherein the unforeseeable certifiable values comprise at least one of: an outdoor temperature, an outdoor humidity level, a dew point temperature, a pollen level, an outdoor ultraviolet index value, a wind speed, a wind chill factor, a tide level, a future weather condition, a user's actual geographic location, a user's proximal geographical location, a score of a sporting event, a value of an equity, a future value of a capital market index, a future vote total in an election, an attendance at a future public event, a future revenue from a motion picture release, a future number of copies sold of an album or musical track, and a future number of registrants to a website or online promotion.

3. The apparatus of claim 1, wherein the predictable future values include a moon phase and an astronomical position of a heavenly body.

4. The apparatus of claim 1, wherein the at least two seed values comprise at least two sub-categories of the same seed value category.

5. The apparatus of claim 1, wherein selecting of at least two of the seed value categories includes selecting at least one UCV.

6. The apparatus of claim 1, wherein, during said selecting, at least one of said at least two seed value categories is randomly selected.

7. The apparatus of claim 1, wherein the software application comprises a lottery contest, the output is a pseudo-random sequence of data generated from the at least one seed value in each of the at least two seed categories, and a winner of the lottery contest is determined by matching the pseudo-random data sequence.

* * * * *